US012291192B2

(12) United States Patent
Chiba

(10) Patent No.: US 12,291,192 B2
(45) Date of Patent: *May 6, 2025

(54) CONTROL APPARATUS, CONTROL METHOD, AND NON-TRANSITORY COMPUTER READABLE MEDIA ENCODED WITH COMPUTER PROGRAM

(71) Applicant: TOYOTA JIDOSHA KABUSHIKI KAISHA, Toyota (JP)

(72) Inventor: Hiroya Chiba, Fuji Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 23 days.

This patent is subject to a terminal disclaimer.

(21) Appl. No.: 18/092,585

(22) Filed: Jan. 3, 2023

(65) Prior Publication Data
US 2023/0256959 A1  Aug. 17, 2023

(30) Foreign Application Priority Data

Feb. 14, 2022 (JP) .................................. 2022-020831

(51) Int. Cl.
*B60W 30/06* (2006.01)
*G05D 1/00* (2024.01)
(Continued)

(52) U.S. Cl.
CPC ........... *B60W 30/06* (2013.01); *G05D 1/0234* (2013.01); *G05D 1/0246* (2013.01);
(Continued)

(58) Field of Classification Search
CPC .............. B60W 2556/40; B60W 30/06; G05D 1/0234; G05D 1/0246; G05D 1/0274;
(Continued)

(56) References Cited

U.S. PATENT DOCUMENTS 6,079,862 A  6/2000 Kawashima et al.
2013/0141578 A1*  6/2013 Chundrlik, Jr. ........... B60R 1/04
348/148

(Continued)

FOREIGN PATENT DOCUMENTS

JP  2006-031144 A  2/2006
JP  2019-098911 A  6/2019
JP  2020-34472 A  3/2020

OTHER PUBLICATIONS

Office Action dated Jul. 18, 2024, issued to U.S. Appl. No. 18/092,588.
(Continued)

*Primary Examiner* — Omer S Khan
(74) *Attorney, Agent, or Firm* — Dinsmore & Shohl LLP

(57) ABSTRACT

A control apparatus for an object moving in a specific zone while recognizing one or more markers deployed in the specific zone by a camera. The control apparatus is configured to execute detecting whether or not that the specific zone or surroundings of the object is darker than a specified brightness, and when detecting that the specific zone or the surroundings of the object is darker than the specified brightness, operating a lighting device installed in the object to illuminate the one or more markers located around the object.

7 Claims, 8 Drawing Sheets

(51) Int. Cl.
*G06V 10/141* (2022.01)
*G06V 10/60* (2022.01)
*G06V 20/58* (2022.01)

(52) U.S. Cl.
CPC ......... *G05D 1/0274* (2013.01); *G06V 10/141* (2022.01); *G06V 10/60* (2022.01); *G06V 20/586* (2022.01); *B60W 2556/40* (2020.02)

(58) Field of Classification Search
CPC .... G06V 10/141; G06V 10/60; G06V 20/586; Y02B 20/40
See application file for complete search history.

(56) References Cited

U.S. PATENT DOCUMENTS

| | | |
|---|---|---|
| 2014/0239848 A1 | 8/2014 | Bradford |
| 2016/0071415 A1* | 3/2016 | Maeda ................. G06V 20/586 348/148 |
| 2018/0196442 A1 | 7/2018 | Wang |
| 2020/0074859 A1 | 3/2020 | Eshima |
| 2020/0207335 A1 | 7/2020 | Oh |
| 2020/0269748 A1* | 8/2020 | Mimura ................. B60Q 1/245 |
| 2021/0016705 A1 | 1/2021 | Hartisch |
| 2021/0183099 A1 | 6/2021 | Fujii et al. |
| 2021/0233404 A1 | 7/2021 | Matsuhana et al. |
| 2022/0277163 A1* | 9/2022 | Stenneth ................. G06T 7/12 |

OTHER PUBLICATIONS

Final Office Action dated Jan. 2, 2025 issued to U.S. Appl. No. 18/092,588.

* cited by examiner

CONTROL APPARATUS, CONTROL METHOD, AND NON-TRANSITORY COMPUTER READABLE MEDIA ENCODED WITH COMPUTER PROGRAM

CROSS-REFERENCE TO RELATED APPLICATION

The present application claims priority under 35 U.S.C. § 119 to Japanese Patent Application No. 2022-020831, filed Feb. 14, 2022, the contents of which application are incorporated herein by reference in their entirety.

BACKGROUND

Technical Field

The present disclosure relates to a technique for controlling an object moving in a specific zone while recognizing one or more marker deployed in the specific zone by a camera. The present disclosure also relates to a technique for controlling a lighting device installed in the object.

Background Art

Patent Literature 1 discloses a parking assistance device that assists automatic parking of a vehicle, the parking assistance device comprising a control unit that turns on a lighting device that illuminates the outside of the vehicle when illuminance outside the vehicle is equal to or less than a predetermined threshold value. Patent Literature 1 also discloses that the parking assist device comprises a detection unit that detects, when the illuminance is equal to or less than the threshold value, a parking target based on an image of the outside of the vehicle with the lighting device turned on. In addition, there is the following Patent Literature 2 as a document showing the technical level of the technical field according to the present disclosure.

LIST OF RELATED ART

Patent Literature1: Japanese Laid-Open Patent Application Publication No. JP-2019-098911
Patent Literature2: Japanese Laid-Open Patent Application Publication No. JP-2006-031144

SUMMARY

In recent years, a technique for controlling an object to move in a specific zone by recognizing one or more markers deployed in the specific zone by a camera has been considered. For example, regarding a technique in which an object travels autonomously such as autonomous driving technology for a vehicle, it has been considered to acquire positions of the one or more markers by recognizing the one or more markers deployed in the specific zone and accurately perform localization of the object to be controlled. Such a technique is considered to be applied to a technique capable of designating the specific zone, such as AVP (Automated Valet Parking) technology.

By the way, the recognizing the one or more markers by a camera is performed by image recognition of a captured image of the surroundings of the target object to be controlled. On the other hand, the brightness of the specific zone changes depending on a location, weather, a time zone, a state of a lighting device installed in the specific zone, and the like. Furthermore, it is assumed that the brightness differs at each point in the specific zone depending on other objects located in the specific zone, the position of the lighting device installed in the specific zone, or the like. For this reason, there is a concern that the one or more markers cannot be sufficiently recognized by the camera due to the specific zone or the surroundings of the target object being dark.

According to the technique disclosed in Patent Literature 1, when the illuminance outside the vehicle is equal to or less than a predetermined threshold value (when it is dark), the lighting device is turned on. However, simply turning on the lighting device may not sufficiently illuminate a desired marker depending on the irradiation direction and the irradiation range of the lighting device, and the desired marker still cannot be recognized.

In the view of the above-described problem, an object of the present disclosure is to provide a technique capable of reducing a situation in which a desired marker cannot be recognized due to the specific zone or the surroundings of the target object being dark.

A first disclosure is directed to a control apparatus for an object moving in a specific zone while recognizing one or more markers deployed in the specific zone by a camera.

The control apparatus comprising:
one or more processors; and
a memory storing executable instructions that, when executed by the one or more processors, cause the one or more processors to execute:
acquiring a brightness information, a marker map information, and an object position information, the brightness information showing brightness in the specific zone, the marker map information showing positions of the one or more markers in the specific zone, the object position information showing a position of the object in the specific zone;
detecting whether or not that the specific zone or surroundings of the object is darker than a specified brightness based on the brightness information; and
when detecting that the specific zone or the surroundings of the object is darker than the specified brightness, operating a lighting device installed in the object to illuminate the one or more markers located around the object based on the maker map information and the object position information.

A second disclosure is directed to a control apparatus further having the following features with respect to the control apparatus according to the first disclosure.
The operating the lighting device includes:
calculating relative positions of the one or more markers to the object based on the marker map information and the object position information; and
controlling at least one of an irradiation range of the lighting device and an irradiation direction of the lighting device viewed from the object depending on the relative positions.

A third disclosure is directed to a control apparatus further having the following features with respect to the control apparatus according to the second disclosure.
The operating the lighting device includes controlling a luminous intensity of the lighting device depending on the brightness information.

A fourth disclosure is directed to a control apparatus further having the following features with respect to the control apparatus according to the first disclosure.

The brightness information includes a luminance value of the one or more markers on an image captured by the camera or an illuminance at positions where the one or more markers are deployed, and the detecting whether or not that the specific zone or the surroundings of the object is darker than the specified brightness includes detecting that the specific zone or the surroundings of the object is darker than the specified brightness when the luminance value or the illuminance is less than a predetermined threshold.

A fifth disclosure is directed to a method for controlling an object moving in a specific zone while recognizing one or more markers deployed in the specific zone by a camera.

The method includes:

acquiring a brightness information, a marker map information, and an object position information, the brightness information showing brightness in the specific zone, the marker map information showing positions of the one or more markers in the specific zone, the object position information showing a position of the object in the specific zone;

detecting whether or not that the specific zone or surroundings of the object is darker than a specified brightness based on the brightness information; and when detecting that the specific zone or the surroundings of the object is darker than the specified brightness, operating a lighting device installed in the object to illuminate the one or more markers located around the object based on the maker map information and the object position information.

A sixth disclosure is directed to one or more non-transitory computer readable media encoded with a computer program.

The computer program comprising instructions that, when executed by one or more processors, cause the one or more processors to perform operations for controlling an object moving in a specific zone while recognizing one or more markers deployed in the specific zone by a camera, the operations comprising:

acquiring a brightness information, a marker map information, and an object position information, the brightness information showing brightness in the specific zone, the marker map information showing positions of the one or more markers in the specific zone, the object position information showing a position of the object in the specific zone;

detecting whether or not that the specific zone or surroundings of the object is darker than a specified brightness based on the brightness information; and when detecting that the specific zone or the surroundings of the object is darker than the specified brightness, operating a lighting device installed in the object to illuminate the one or more markers located around the object based on the maker map information and the object position information.

According to the present disclosure, when the specific zone or the surroundings of the target object is dark, the lighting device is controlled to illuminate the one or more markers located around the target object based on the marker map information and the object position information. It is thus possible to sufficiently illuminate a marker to be recognized by the camera. Consequently, it is possible to reduce a situation in which a desired marker cannot be recognized due to the specific zone or the surroundings of the target object being dark.

EMBODIMENTS

Hereinafter, an embodiment of the present disclosure will be described with reference to the drawings. Note that when the numerals of the numbers, the quantities, the amounts, the ranges, and the like of the respective elements are mentioned in the embodiments shown as follows, the present disclosure is not limited to the mentioned numerals unless specially explicitly described otherwise, or unless the present disclosure is explicitly specified by the numerals theoretically. Furthermore, structures or the like that are described in conjunction with the following embodiment is not necessary to the concept of the present disclosure unless explicitly described otherwise, or unless the present disclosure is explicitly specified by the structures or the like theoretically. Note that in the respective drawings, the same or corresponding parts are assigned with the same reference signs, and redundant explanations of the parts are properly simplified or omitted.

1. Outline

A control apparatus according to the present embodiment controls an object to move in a specific zone while recognizing one or more markers deployed in the specific zone by a camera. A technique of controlling the object to move in the specific zone while recognizing the one or more markers by a camera is applied to, for example, AVP technology. In this case, the object to be controlled is a vehicle to be parked, and the specific zone is a parking lot where the vehicle is parked by AVP. In the following, the present embodiment will be described by taking as an example the case where it is applied to AVP.

Figure 1:
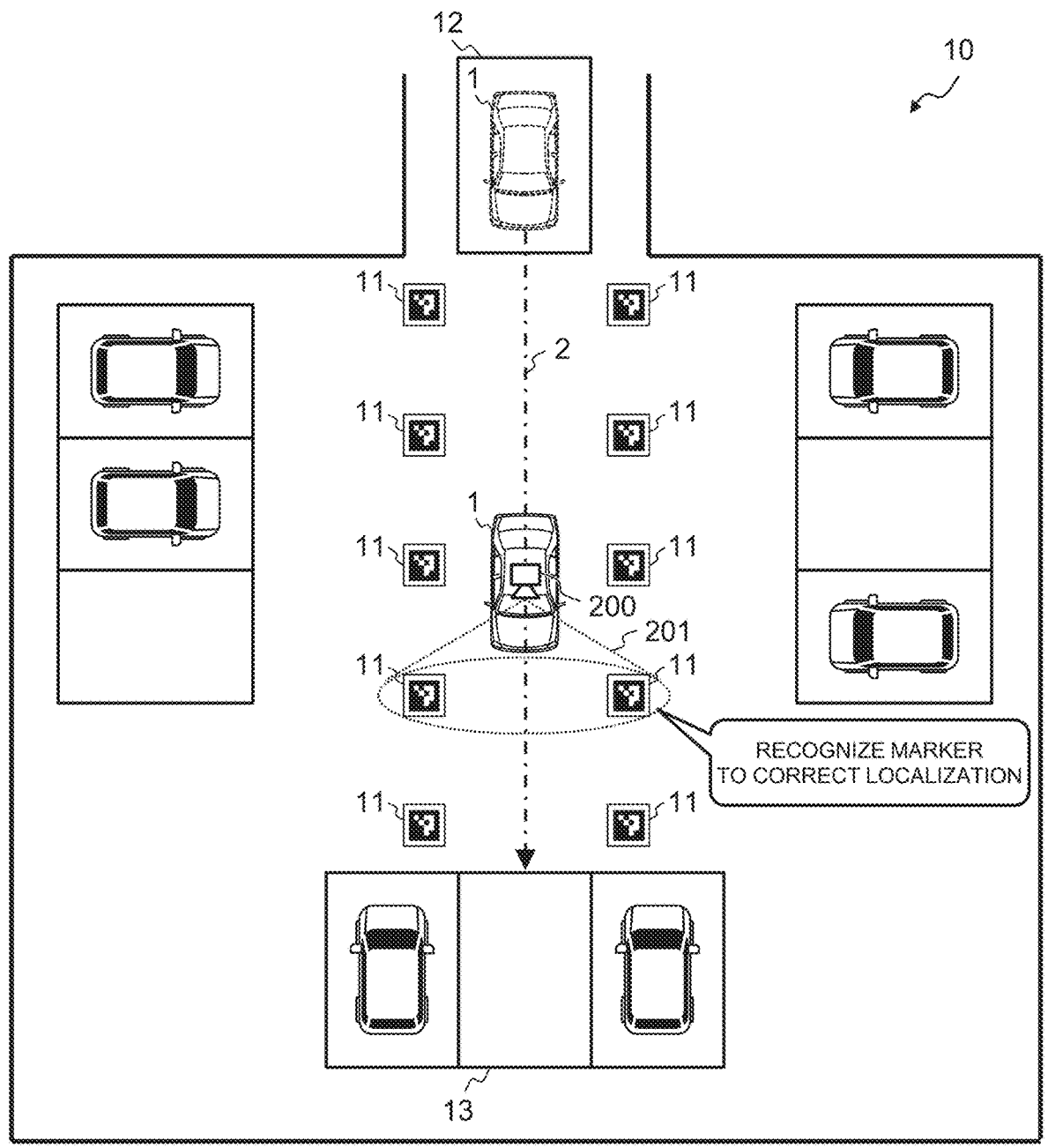
FIG. 1 is a conceptual diagram for explaining an outline of AVP for parking a vehicle while recognizing one or more markers by a camera.

First, with reference to FIG. 1, an outline of AVP for parking a vehicle 1 while recognizing one or more markers 11 by a camera 200 will be described. FIG. 1 shows a state in which the vehicle 1 autonomously travels from an entrance position 12 to a target parking position 13 in a parking lot 10 by AVP. The camera 200 is mounted on the vehicle 1 and captures an image of the surroundings of the vehicle 1. The camera 200 includes a camera having an imaging range 201 in front of the vehicle 1. The control apparatus executes a process determining the target parking position 13 and generating the traveling route 2 based on information (surrounding environment information, travel state information, or the like) acquired by a sensor provided in the vehicle 1, information (map information of the parking lot 10, information on parking lot usage, or the like) acquired by communication with an external server, or the like. Then, the control apparatus executes controlling the vehicle 1 to travel along the traveling route 2.

In AVP, localization of the vehicle 1 is generally performed. The accuracy of localization is important in optimization of the generated traveling route 2, stability of control of the vehicle 1, and the like. Especially in AVP, there is a high possibility that the vehicle 1 travels on a road having many obstacles (other parked vehicles, pillars, or the like) or a relatively narrow road, and parking control requiring complicated operations is performed. For this reason, more accurate localization is required in AVP.

Therefore, in AVP, as shown in FIG. 1, it is considered to deploy one or more markers 11 in the parking lot 10, and to correct the localization of the vehicle 1 by recognizing each of the one or more markers 11 sequentially. For example, the control apparatus acquires positions of the one or more markers 11 around the vehicle 1 by recognizing the one or more markers 11, and corrects the localization based on the relative positions between the one or more markers 11 and the vehicle 1. Here, the one or more markers 11 is recognized by image recognition of an image captured by the camera 200. Each of the one or more markers 11 is, for example, a two-dimensional barcode and is attached to a floor surface, a wall surface, an installation object, or the like in the parking lot 10. Each of the one or more markers 11 may adopt another form that can be encoded by image recognition based on a predetermined standard.

Figure 2:
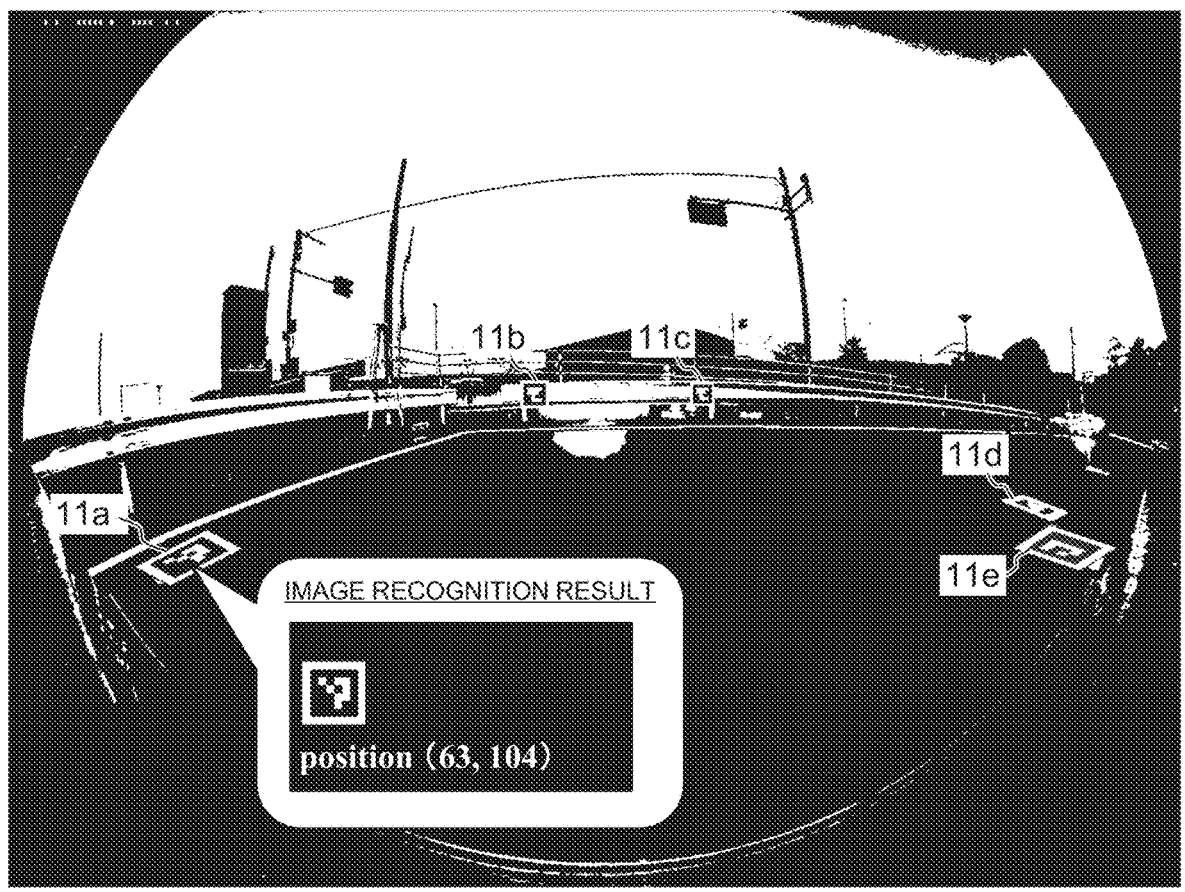
FIG. 2 is a diagram illustrating an example of an image captured by a camera and recognition of a marker.

FIG. 2 illustrates an example of an image captured by the camera 200 and an example of an image recognition result of the one or more markers 11. In FIG. 2, five markers (11*a*, 11*b*, 11*c*, 11*d*, and 11*e*) are shown in the image captured by the camera 200. And in FIG. 2, the position of the marker 11*a* is shown as the image recognition result. The image recognition is performed, for example, by converting the one or more markers 11 shown in the image from the camera coordinate system into the plane coordinate system and encoding the transformed markers based on a predetermined standard. By image recognition, ID information of the marker 11*a* may be acquired as the image recognition result. Image recognition for the one or more markers 11 shown in the image may be performed in parallel.

The ID information can be used to acquire various kinds of information about the recognized marker by referring a database. In this case, the database may be stored in a memory included in the control apparatus or may be managed by an external server. The position of the recognized marker may be acquired by referring the database based on the ID information. In this case, it is not necessary to directly acquire the position of the recognized marker as the image recognition result.

Thus, in AVP, it is considered that the vehicle 1 parks while recognizing the one or markers 11 by the camera 200. In localization such as dead reckoning, the accuracy may decrease due to the historical effect of estimation errors. Therefore, by sequentially correcting the localization while recognizing the one or more markers 11 by the camera 200, the accuracy of localization can be improved. It is thus possible to improve AVP performance.

Figure 3:
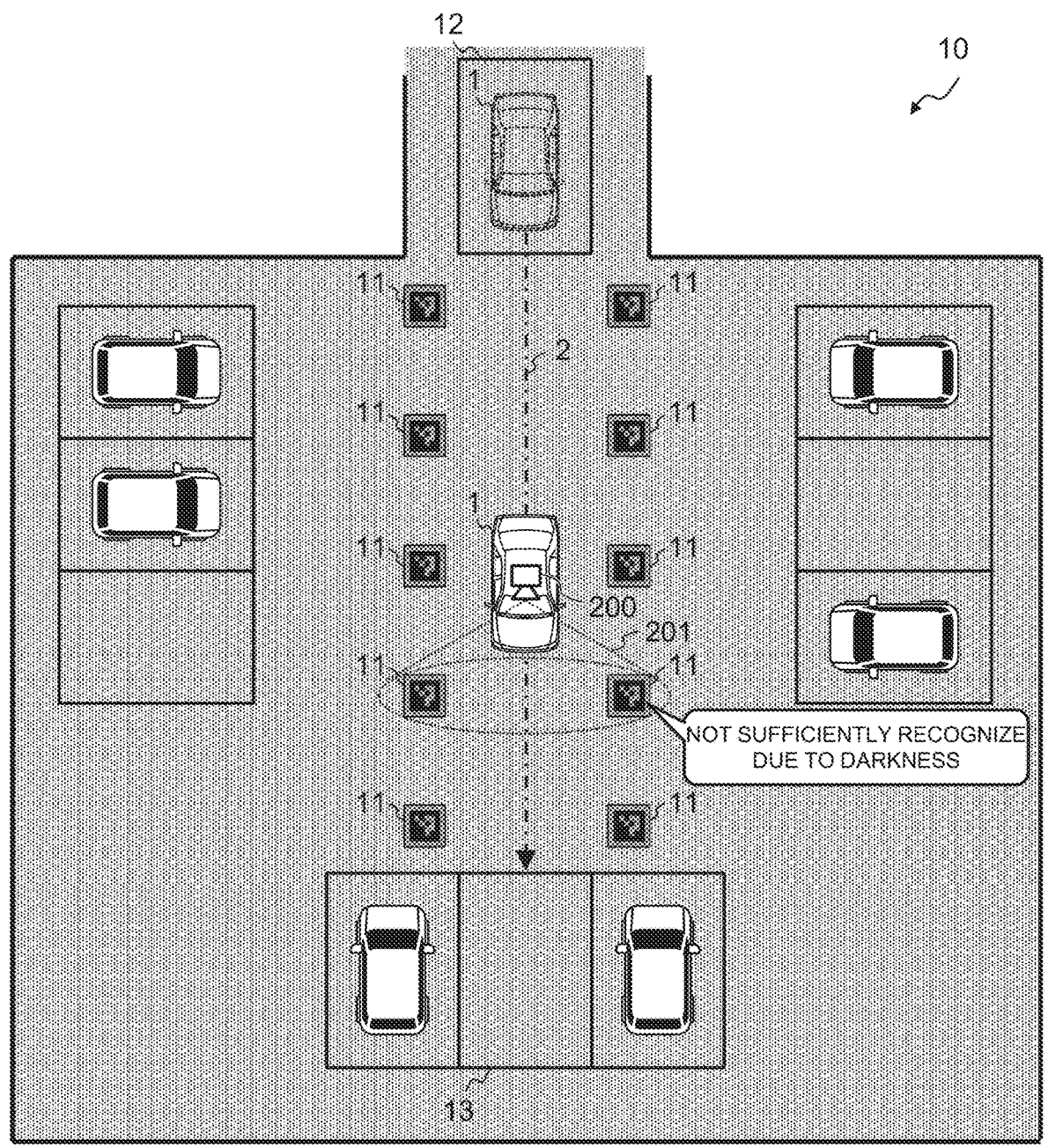
FIG. 3 is a conceptual diagram showing a situation where recognizing one or more markers by a camera cannot be sufficiently performed due to darkness around a parking lot or a vehicle.

By the way, the brightness of the parking lot 10 changes depending on the location, weather, time zone, the state of lighting devices equipped in the parking lot 10, and the like. For example, an above-ground parking lot will be dark during cloudy, rainy, or night hours. An underground parking lot becomes dark due to a failure of installed lighting devices or a setting of brightness of that. Furthermore, it is assumed that the brightness differs at each point in the parking lot 10 depending on objects located in the parking lot 10, the positions of lighting devices equipped in the parking lot 10, or the like. For example, a point by a parked vehicle or a pillar will be darker if it casts a shadow. And a point away from the position where the lighting device is installed becomes dark. For these reasons, as shown in FIG. 3, there is a possibility that recognizing the one or more markers 11 by the camera 200 cannot be sufficiently performed due to darkness around the parking lot 10 or the vehicle 1.

Conventionally, when detecting that the surroundings of the vehicle 1 do not satisfy a specified brightness, a lighting device (a headlight, a taillight, and the like) installed in the vehicle 1 is turned on. However, simply turning on the lighting device may not sufficiently illuminate a desired marker depending on the irradiation direction and the irradiation range of the lighting device, and the desired marker still cannot be recognized.

Figure 4:
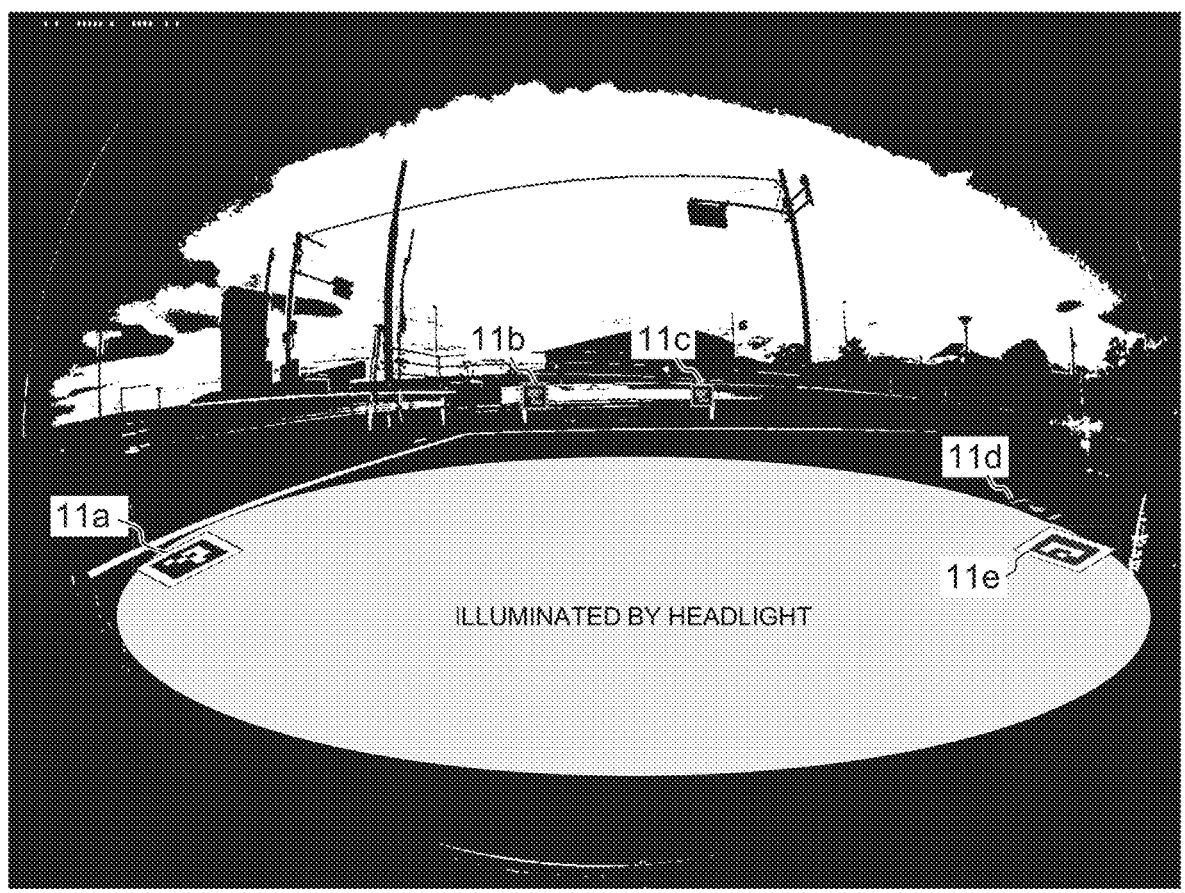
FIG. 4 is a conceptual diagram showing an example of an image captured by a camera when illuminated by a headlight provided in a vehicle.

FIG. 4 illustrates an example of an image captured by the camera 200 when illuminated by a headlight provided in the vehicle 1. In FIG. 4, as in the case shown in FIG. 2, five markers (11*a*, 11*b*, 11*c*, 11*d*, and 11*e*) are shown in the image captured by the camera 200. Especially FIG. 4 illustrates a situation in which the surroundings of the vehicle 1 are dark and the one or more markers 11 cannot be sufficiently recognized unless illuminating by the lighting device installed in the vehicle 1. In FIG. 4, the marker 11*a* and the marker 11*e* are illuminated by the headlight and can be sufficiently recognized. On the other hand, the marker 11*b*, the marker 11*c*, and the marker 11*d* are not illuminated by the headlight, and cannot be sufficiently recognized. Therefore, as it stands, this poses a problem when the marker 11*b*, the marker 11*c*, or the marker 11*d* is to be recognized. As described above, depending on the irradiation direction and irradiation range of the lighting device, there is a possibility that a desired marker cannot be sufficiently recognized because the parking lot 10 or the surroundings of the vehicle 1 are dark.

The control apparatus according to the present embodiment acquires a brightness information, a marker map information, and a vehicle position information. Here, the brightness information shows brightness in the parking lot 10, marker map information shows positions of the one or more markers 11 in the parking lot 10, and the vehicle position information shows a position of the vehicle 1 in the parking lot 10. And the control apparatus according to the present embodiment executes detecting whether or not that the parking lot 10 or surroundings of the vehicle 1 is darker than a specified brightness based on the brightness information. Then, when detecting that the parking lot 10 or surroundings of the vehicle 1 is darker than the specified brightness, the control apparatus executes processing (hereinafter also referred to as "illumination control processing") of operating the lighting device to illuminate the one or more markers 11 located around the vehicle 1 based on the maker map information and the vehicle position information.

The marker map information is, for example, information in which the position in the parking lot 10 for each of the one or more markers 11 is represented by coordinates (e.g., two-dimensional orthogonal coordinates). In addition, the marker map information may be configured to give the position of each of the one or more markers 11 in response to ID information of each of the one or more markers 11. By adopting this configuration, it is possible to acquire the position of the recognized marker from the ID information of the recognized marker. The marker map information may be stored in a memory included in the control apparatus or may be managed by an external server.

Figure 5:
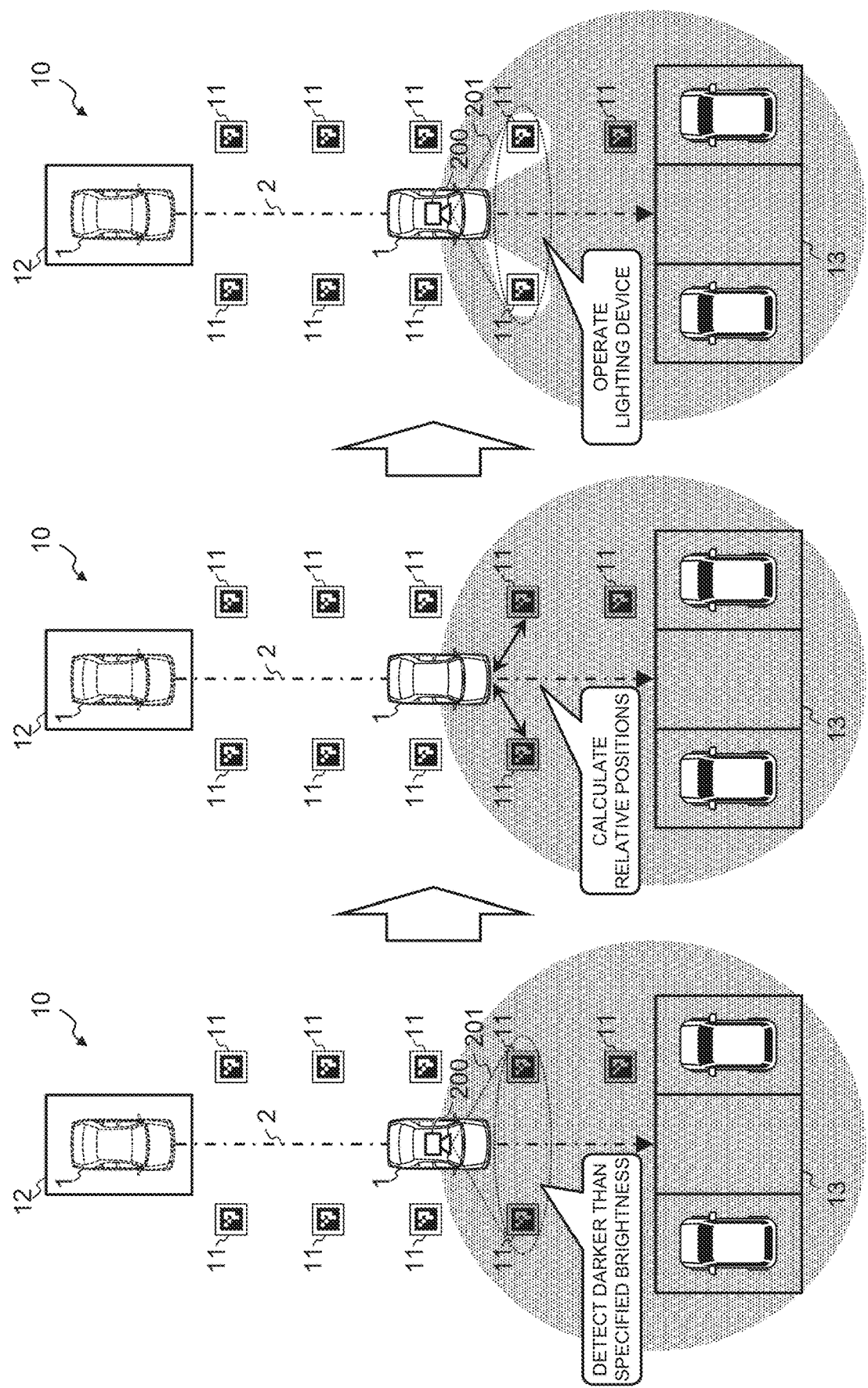
FIG. 5 is a conceptual diagram showing an outline of processing executed by a control apparatus according to the present embodiment.

FIG. 5 shows an outline of the processing executed by the control apparatus according to the present embodiment. First, the control apparatus according executes processing (hereinafter, also referred to as "darkness detection processing") of detecting whether or not that the parking lot 10 or the surroundings of the vehicle 1 is darker than a specified brightness based on the brightness information. Examples of the brightness information include a time zone, an operation state of lighting devices equipped in parking lot 10, and detection information of an illuminance sensor installed in the vehicle 1. For example, when the illuminance detected by the illuminance sensor is equal to or less than a predetermined threshold value, the control apparatus determines that the surroundings of the vehicle 1 is darker than the specified brightness. Alternatively, for example, in the case of the parking lot 10 on the ground, when the time zone is the sunset time zone, the control apparatus determines that the parking lot 10 is darker than the specified brightness.

The control apparatus according to the present embodiment may be configured to acquire, as the brightness information, a luminance value of the one or more markers 11 on the image captured by the camera 200 or an illuminance at positions where the one or more markers 11 are deployed. And in the darkness detection processing, the control apparatus may be configured to determine that the parking lot 10 or the surroundings of the vehicle 1 is darker than the specified brightness when the luminance value or the illuminance is less than a predetermined threshold. By adopting this configuration, it is possible to appropriately execute the darkness detection processing corresponding to markers to be recognized. As a result, unnecessary operation of the lighting device can be suppressed.

Next, the control apparatus according to the present embodiment executes calculating relative positions of the one or more markers 11 to the vehicle 1 based on the marker map information and the vehicle position information. Here, the relative positions may include relative distances between the one or more markers 11 and the vehicle 1 and directions of the one or more markers 11 viewed from the vehicle 1.

Figure 6:
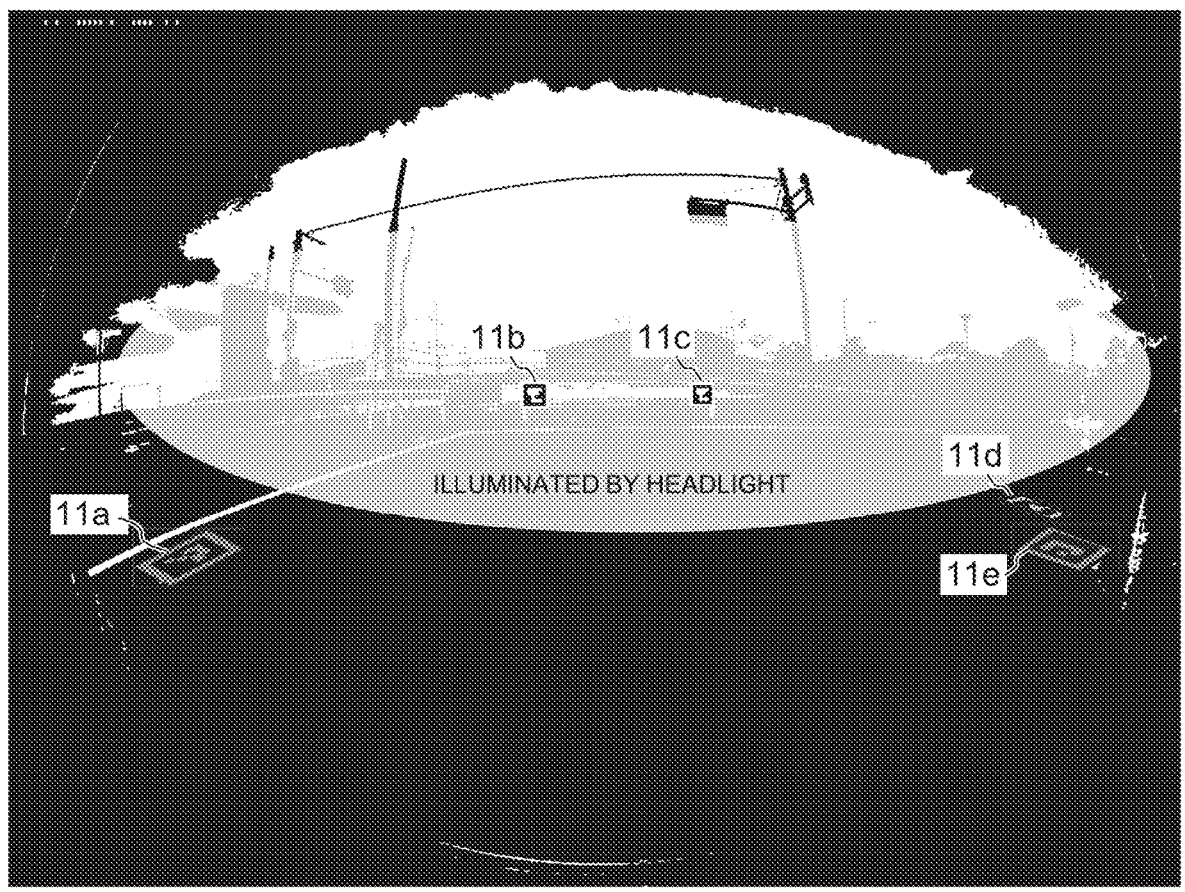
FIG. 6 is a conceptual diagram showing an example of an image captured by a camera when a headlight is controlled by a control apparatus according to the present embodiment in contrast to FIG. 4.

Then, the control apparatus according to the present embodiment executes operating the lighting device to illuminate the one or more markers 11 located around the vehicle 1. The operating the lighting device may be performed to control at least one of an irradiation range of the lighting device and an irradiation direction of the lighting device viewed from the vehicle 1 depending on the calculated relative positions. For example, for illuminating the marker to be recognized, the control apparatus executes operating the headlight to be set to a high beam depending on the calculated relative positions. FIG. 6 illustrates an example of an image captured by the camera 200 when the headlight is operated by the control apparatus according to the present embodiment. FIG. 6 shows a situation similar to FIG. 4. But in FIG. 6, as compared with FIG. 4, the marker 11b and the marker 11c are illuminated by the headlight. Therefore, according to the present embodiment, the marker 11b or the marker 11c is also sufficiently recognized.

Further, the control apparatus according to the present embodiment may be configured to, in the illumination control processing, control a luminous intensity of the lighting device depending on the brightness information. By adopting this configuration, it is possible to cope with a case where the luminous intensity is insufficient to recognize the one or more markers 11.

As described above, according to the present embodiment, it is possible to sufficiently illuminate the one or more markers 11 to be recognized by the camera 200. As a result, it is possible to reduce a situation in which a desired marker cannot be recognized due to the parking lot 10 or the surroundings of the vehicle 1 being dark.

2. Configuration

Figure 7:
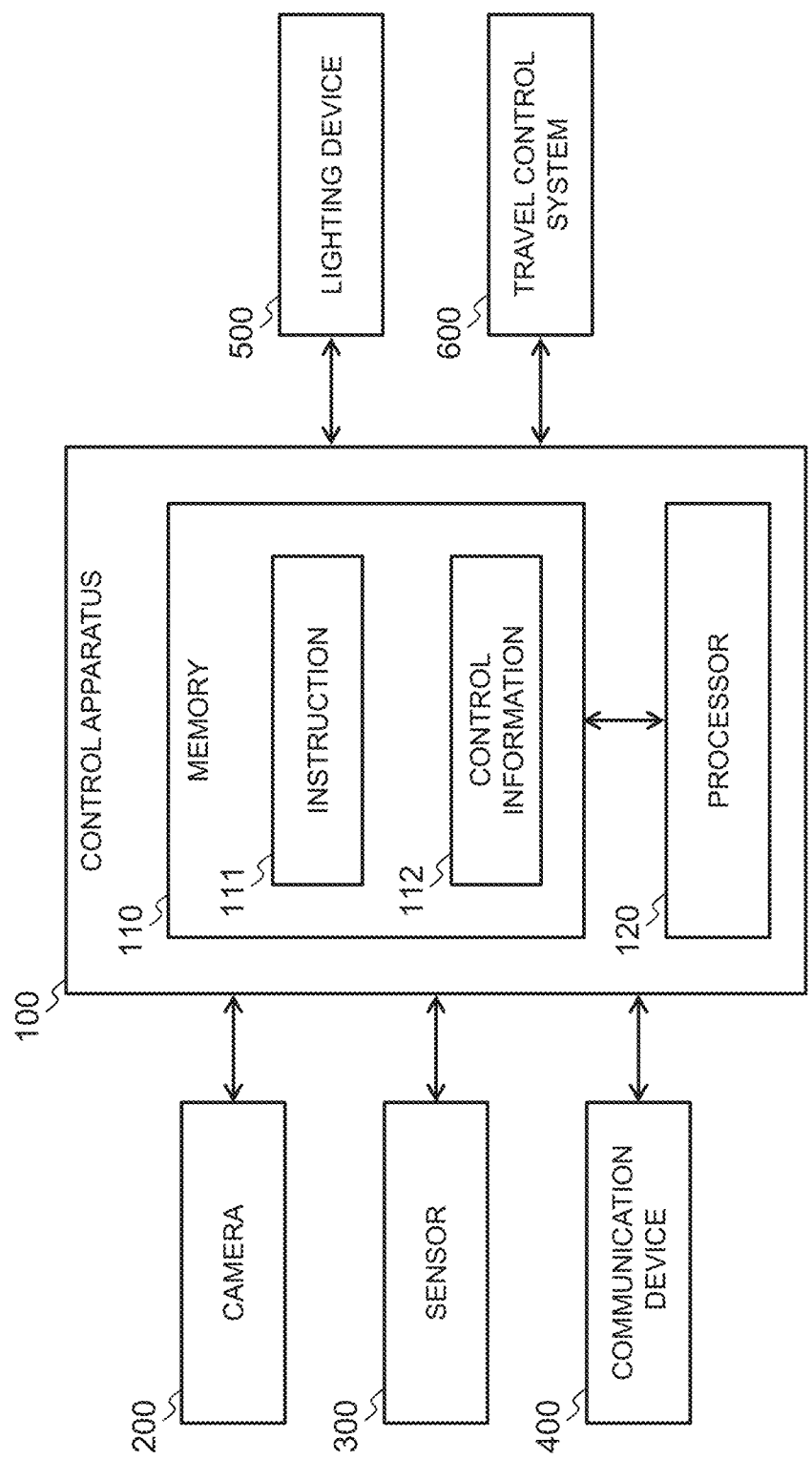
FIG. 7 is a block diagram showing a schematic configuration of a control apparatus according to the present embodiment.

Hereinafter, a schematic configuration of the control apparatus according to the present embodiment will be described. FIG. 7 is a block diagram showing the schematic configuration of the control apparatus 100 according to the present embodiment. The control apparatus 100 is configured to transmit/receive information to/from the camera 200, a sensor 300, a communication device 400, a lighting device 500, and the travel control system 600. For example, the control apparatus 100 is connected to these devices by cable harnesses, wireless communication, or the like.

The camera 200 captures an image of the surroundings of the vehicle 1 and outputs the captured image. The camera 200 may be configured to perform image recognition for the captured image and output the image recognition result. In this case, the image recognition includes recognizing the one or more markers 11 shown on the captured image. Furthermore, the camera 200 may be configured to output information of the luminance value of the one or more markers 11 on the captured image. The output of the camera 200 is transmitted to the control apparatus 100.

The sensor 300 detects driving environment information of the vehicle 1 and outputs detection information. The detection information output by the sensor 300 is transmitted to the control apparatus 100. The sensor 300 typically includes a sensor for detecting a surrounding environment (a preceding vehicle, a white line, an obstacle, or the like) of the vehicle 1 and a sensor for detecting a traveling state (vehicle speed, acceleration, yaw rate, or the like) of the vehicle 1. Examples of the sensor for detecting the surrounding environment of the vehicle 1 include a millimeter wave radar, a LiDAR (Light Detection and Ranging), and the like. Examples of the sensor for detecting the traveling state of the vehicle 1 include a wheel speed sensor, a G sensor, a gyro sensor, and the like. The sensor 300 may also include an illuminance sensor that detects illuminance around the vehicle 1.

The communication device 400 transmits/receives various kinds of information by communicating with a device outside the vehicle 1. Examples of the communication device 400 include a device that connects to the Internet and communicates with a server on the Internet, a device that communicates with infrastructure or a nearby the vehicle 1, a GPS receiver, and the like. The information received by the communication device 400 is transmitted to the control apparatus 100. Examples of the information transmitted to the control apparatus 100 from the communication device 400 include map information, road traffic information, GPS-based position information, time information, weather information, and the like. Further, the information transmitted to the control apparatus 100 from the communication device 400 may include information about the parking lot 10. For example, the information may include a use state of the parking lot 10, position information of parked vehicles in the parking lot 10, position information of pillars or installed objects in the parking lot 10, an operation state of lighting devices equipped in the parking lot 10, and the like. In particular, the information may include the marker map information.

The control apparatus 100 executes processing related to AVP based on acquired information and outputs control signals. The control apparatus 100 is, for example, realized by one or more ECUs (Electronic Control Units) installed in the vehicle 1. However, the control apparatus 100 may be a device outside the vehicle 1. For example, the control apparatus 100 may be realized by a server configured on a communication network (typically, the Internet). In this case, the control apparatus 100 acquires information and transmits the control signals through the communication network.

The control apparatus 100 is a computer including a memory 110 and a processor 120. The memory 110 is connected to the processor 120, and stores executable instructions 111 and control information 112 for performing processing. Information acquired by the control apparatus 100 is stored in the memory 110 as the control information 112.

The processor 120 operates in accordance with the instructions 111, the execution of processing based on the control information 112 is realized. For example, execution of processing for recognizing traveling environment of the vehicle 1, localization processing, processing for generating the traveling route 2, processing for controlling the vehicle 1 along the traveling route 2, and the like is realized. In the present embodiment, execution of illumination control processing and darkness detection processing is realized. And in the localization processing, correction of localization based by recognizing the one or more markers 11 is performed.

The instructions 111 are provided by a computer program. Therefore, in other words, the processor 120 executes processing in accordance with the computer program. The memory 110 may also be referred to as "program memory". And the memory 110 may be configured of one or more non-transitory computer readable media.

The control signals for controlling the lighting device 500 by the control device 100 are transmitted to the lighting device 500. For example, the control signals transmitted to the lighting device 500 include a control signal for switching on and off the operation of the lighting device 500, a control signal for giving a control amount related to the luminous intensity, irradiation range, and irradiation direction of the lighting device 500, and the like. In addition, the control signals for controlling the traveling of the vehicle 1 by the control apparatus 100 are transmitted to the travel control system 600. For example, the control signals transmitted to the travel control system 600 include a control signal that gives a control amount related to acceleration, steering, or braking, and the like.

The lighting device 500 illuminates the surroundings of the vehicle 1. In particular, the lighting device 500 is configured to be able to switch on and off the operation, and to adjust the luminous intensity, the irradiation range, and the irradiation direction according to the control signals obtained from the control apparatus 100. That is, the control of the lighting device 500 by the control apparatus 100 is realized by the lighting device 500 operating in accordance with the control signals acquired from the control apparatus. Examples of the lighting device 500 installed in the vehicle 1 include a welcome light, a headlight, a taillight, and the like. The welcome light can be effectively utilized in an environment where the one or more markers 11 are deployed on the floor surface of the parking lot 10. The lighting device 500 may be a device additionally provided for the purpose of illuminating the marker 11.

The travel control system 600 controls the traveling of the vehicle 1. AVP of the vehicle 1 by the control apparatus 100 is realized by the travel control system 600 controlling the traveling of the vehicle 1 in accordance with the control signals acquired from the control apparatus 100. The travel control system 600 is configured of, for example, a group of actuators installed in the vehicle 1 and ECUs for controlling operations of the group of actuators. Examples of the group of actuators installed in the vehicle 1 include an actuator that drives a power unit (an internal combustion engine, an electric motor, or the like), an actuator that drives a brake mechanism, an actuator that drives a steering mechanism, and the like.

3. Processing

Hereinafter, the processing executed by the processor 120 in the control apparatus 100 according to the present embodiment will be described. In particular, the processing for operating the lighting device 500 will be described.

Figure 8:
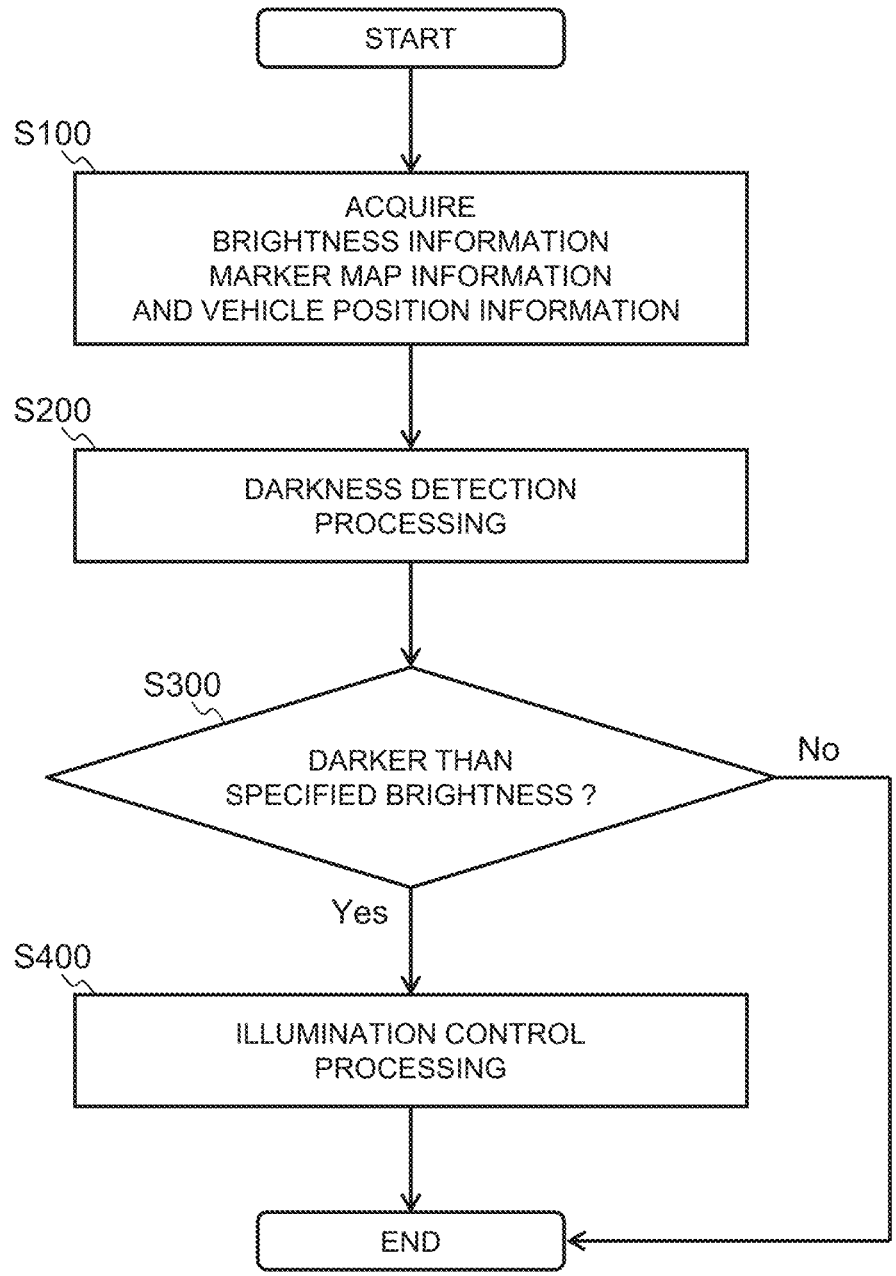
FIG. 8 is a flowchart showing processing executed by a control apparatus according to the present embodiment.

FIG. 8 is a flowchart illustrating the processing for operating the lighting device 500. The flowchart shown in FIG. 8 is, for example, started by executing AVP, and is repeatedly executed for each predetermined control period while AVP is continuing.

In step S100, the processor 120 executes acquiring the brightness information, the marker map information, and the vehicle position information in the specific zone (the parking lot 10). The brightness information may include the luminance value or the illuminance for the one or more markers 11. In this case, the luminance value can be calculated from the image captured by the camera 200. Alternatively, the control apparatus 100 may be configured to acquire it from the camera 200. The illuminance can be acquired from the illuminance sensor installed in the vehicle 1. Alternatively, the processor 120 may be configured to calculate it from acquired information (e.g., time zone). The marker map information may be stored in advance in the memory 110 as the control information 112, or may be acquired from an external server via the communication device 400. The vehicle position information is, for example, a localization result. Alternatively, the vehicle position information may be a GPS information.

After step S100, the processing proceeds to step S200.

In step S200, the processor 120 executes the darkness detection processing based on the brightness information acquired in step S100. When the processor 120 detects that the specific zone (parking lot 10) or the surroundings of the vehicle 1 is darker than the specified brightness (step S300; Yes), the processing proceeds to step S400. When the processor 120 does not detect that the specific zone (parking lot 10) or the surroundings of the vehicle 1 is darker than the specified brightness (step S300; No), the current processing ends without executing the illumination control processing.

In step S400, the processor 120 executes the illumination control processing based on the marker map information and the vehicle position information acquired in step S100. The illumination control processing includes calculating the relative positions of the one or more markers 11 to the vehicle 1 based on the marker map information and the vehicle position information. Then, in the illumination control processing, the processor 120 executes operating the lighting device 500 to illuminate the one or more markers 11 located around the vehicle 1 depending on the calculated relative positions. For example, the processor 120 generates control signals for controlling at least one of the irradiation range of the lighting device and the irradiation direction of the lighting device viewed from the vehicle 1 depending on the calculated relative positions. Furthermore, the processor 120 may generate control signals for controlling the luminous intensity of the lighting device 500 based on the brightness information acquired in step device 500.

The processor 120 may be configured to sequentially execute the illumination control processing for each of the one or more markers 11. By adopting this configuration, it is possible to recognize all markers shown on the image captured by the camera 200 while reducing a situation in which a desired marker cannot be recognized because the specific zone (parking lot 10) or the surroundings of the vehicle 1 are dark. The processor 120 may be configured to execute the illumination control processing for a marker having the highest luminance value among the one or more markers 11 shown on the image. When adopting this configuration, it is possible to reduce the processing load.

After step S400, the current processing ends.

The localization processing including recognizing the one or more markers 11 and correcting localization may be executed in parallel with the processing shown in FIG. 8.

As described above, the processor 120 executes the processing for operating the lighting device 500. In addition, by the control apparatus 100 according to the present embodiment, a control method for controlling an object (the vehicle 1) moving in a specific zone (the parking lot 10) while recognizing one or more markers (the one or more markers 11) deployed in the specific zone (the parking lot 10) by a camera (the camera 200) is realized.

4. Effect

As described above, according to the present embodiment, when detecting that the parking lot 10 or the surrounding the vehicle 1 is darker than the specified brightness, the lighting device 500 is operated to illuminate the one or more markers 11 located around the vehicle 1 based on the marker map information and the vehicle position information. It is thus possible to sufficiently illuminate markers to be recognized by the camera 200. As a result, it is possible to reduce a situation in which a desired marker cannot be recognized due to the parking lot 10 or the surroundings of the vehicle 1 being dark.

Although the above description is for taking the case where the present embodiment is applied to AVP, the present embodiment can be applied to other techniques controlling an object to move in a specific zone by recognizing one or more markers deployed in the specific zone by a camera. For example, the present disclosure can be applied to a patrol robot system that patrols a specific zone while performing localization by recognizing one or more markers by a camera.

What is claimed is:

1. A control apparatus for an object moving in a specific zone while recognizing one or more markers deployed in the specific zone by a camera, the control apparatus comprising:
one or more processors; and
a memory storing executable instructions that, when executed by the one or more processors, cause the one or more processors to execute:
acquiring a brightness information, a marker map information, and an object position information, the brightness information showing brightness in the specific zone, the marker map information showing positions of the one or more markers in the specific zone, the object position information showing a position of the object in the specific zone;
detecting whether or not that the specific zone or surroundings of the object is darker than a specified brightness based on the brightness information; and
when detecting that the specific zone or the surroundings of the object is darker than the specified brightness, operating a headlight installed in the object to illuminate the one or more markers located around the object based on the maker map information and the object position information, wherein
the brightness information includes a luminance value of the one or more markers on an image captured by the camera,
the detecting whether or not that the specific zone or the surroundings of the object is darker than the specified brightness includes detecting that the specific zone or the surroundings of the object is darker than the specified brightness when the luminance value is less than a predetermined threshold,
the operating of the headlight includes:
calculating relative positions of the one or more markers to the object based on the marker map information and the object position information; and
controlling, in response to the calculated positions of the one or more markers to the object, at least one of an irradiation range of the headlight and an irradiation direction of the headlight viewed from the object depending on the relative positions; and
the one or more processors are configured to perform localization of the object, and correct the localization of the object by sequentially recognizing the one or more markers based on the relative positions between the one or more markers and the object.

2. The control apparatus according to claim 1, wherein the operating the headlight includes controlling a luminous intensity of the headlight in response to acquiring the brightness information.

3. The control apparatus according to claim 1, wherein the one or more markers comprises a barcode, and the brightness information is used to determine includes a time zone, an operation state of lights in a parking lot on a ground when the time zone is a sunset time zone, and detection information of a sensor installed in the vehicle.

4. A method for controlling an object moving in a specific zone while recognizing one or more markers deployed in the specific zone by a camera, the method including:
acquiring a brightness information, a marker map information, and an object position information, the brightness information showing brightness in the specific zone, the marker map information showing positions of the one or more markers in the specific zone, the object position information showing a position of the object in the specific zone;
detecting whether or not that the specific zone or surroundings of the object is darker than a specified brightness based on the brightness information; and
when detecting that the specific zone or the surroundings of the object is darker than the specified brightness, operating a headlight installed in the object to illuminate the one or more markers located around the object based on the maker map information and the object position information, wherein the brightness information includes a luminance value of the one or more markers on an image captured by the camera, and the detecting whether or not that the specific zone or the surroundings of the object is darker than the specified brightness includes detecting that the specific zone or the surroundings of the object is darker than the specified brightness when the luminance value is less than a predetermined threshold, wherein the operating of the headlight includes:
    calculating relative positions of the one or more markers to the object based on the marker map information and the object position information; and
    controlling, in response to the calculated positions of the one or more markers to the object, at least one of an irradiation range of the headlight and an irradiation direction of the headlight viewed from the object depending on the relative positions; and
    performing localization of the object, and correcting the localization of the object by sequentially recognizing the one or more markers based on the relative positions between the one or more markers and the object.

5. The method according to claim 4, wherein
the one or more markers comprises a barcode, and
the brightness information is used to determine a time zone, an operation state of lights in a parking lot on a ground when the time zone is a sunset time zone, and detection information of a sensor installed in the vehicle.

6. A non-transitory computer readable medium storing a computer program, the computer program comprising instructions that, when executed by one or more processors, cause the one or more processors to perform operations for controlling an object moving in a specific zone while recognizing one or more markers deployed in the specific zone by a camera, the operations comprising:
    acquiring a brightness information, a marker map information, and an object position information, the brightness information showing brightness in the specific zone, the marker map information showing positions of the one or more markers in the specific zone, the object position information showing a position of the object in the specific zone;
    detecting whether or not that the specific zone or surroundings of the object is darker than a specified brightness based on the brightness information; and
    when detecting that the specific zone or the surroundings of the object is darker than the specified brightness, operating a headlight installed in the object to illuminate the one or more markers located around the object based on the maker map information and the object position information, wherein the brightness information includes a luminance value of the one or more markers on an image captured by the camera, and the detecting whether or not that the specific zone or the surroundings of the object is darker than the specified brightness includes detecting that the specific zone or the surroundings of the object is darker than the specified brightness when the luminance value is less than a predetermined threshold, wherein the operating of the headlight includes:
    calculating relative positions of the one or more markers to the object based on the marker map information and the object position information; and
    controlling, in response to the calculated positions of the one or more markers to the object, at least one of an irradiation range of the headlight and an irradiation direction of the headlight viewed from the object depending on the relative positions; and
    performing localization of the object, and correcting the localization of the object by sequentially recognizing the one or more markers based on the relative positions between the one or more markers and the object.

7. The non-transitory computer readable medium according to claim 6, wherein
the one or more markers comprises a barcode, and
the brightness information is used to determine a time zone, an operation state of lights in a parking lot on a ground when the time zone is a sunset time zone, and detection information of a sensor installed in the vehicle.

\* \* \* \* \*